United States Patent
Nobbs

[19]

[11] Patent Number: 5,771,628
[45] Date of Patent: Jun. 30, 1998

[54] INSECT AND PEST TRAP

[75] Inventor: Jeffrey Mulford Nobbs, Hacienda Heights, Calif.

[73] Assignee: Jeunique International, Inc., City of Industry, Calif.

[21] Appl. No.: 738,914

[22] Filed: Oct. 25, 1996

[51] Int. Cl.$^6$ .............................. A01M 1/12; A01M 1/18
[52] U.S. Cl. ............................................ 43/121; 43/132.1
[58] Field of Search .......................... 43/121, 107, 132.1

[56] References Cited

U.S. PATENT DOCUMENTS

| | | | |
|---|---|---|---|
| 2,722,081 | 11/1955 | Heffner | 43/121 |
| 3,913,259 | 10/1975 | Nishimura et al. | 43/121 |
| 3,984,937 | 10/1976 | Hamilton | 43/137 |
| 4,044,495 | 8/1977 | Nishimura et al. | 43/114 |
| 4,173,093 | 11/1979 | Nakai | 43/121 |
| 4,214,400 | 7/1980 | Patmore et al. | 43/121 |
| 4,263,740 | 4/1981 | Hemsarth et al. | 43/121 |
| 4,337,592 | 7/1982 | Hasegawa | 43/107 |
| 4,395,842 | 8/1983 | Margulies | 43/114 |
| 4,423,564 | 1/1984 | Davies et al. | 43/121 |
| 4,709,503 | 12/1987 | McQueen | 43/121 |
| 4,793,093 | 12/1988 | Gentile | 43/132.1 |
| 4,819,371 | 4/1989 | Cohen | 43/131 |
| 4,823,506 | 4/1989 | Demarest et al. | 43/131 |
| 4,837,969 | 6/1989 | Demarest | 43/131 |
| 5,050,338 | 9/1991 | Doakley et al. | 43/132.1 |
| 5,414,954 | 5/1995 | Long | 43/121 |
| 5,548,922 | 8/1996 | Wefler | 43/132.1 |

FOREIGN PATENT DOCUMENTS

| | | | |
|---|---|---|---|
| 298467 | 2/1992 | Germany | 43/121 |
| 2224228 | 10/1987 | Japan | 43/121 |
| 1301821 | 1/1973 | United Kingdom | 43/121 |

*Primary Examiner*—Michael J. Carone
*Assistant Examiner*—Darren Ark
*Attorney, Agent, or Firm*—Beehler & Pavitt

[57] ABSTRACT

An improved insect and pest trap for roaches of various sizes and the like includes an elongated lower housing having side walls and end walls which are inclined in opposite directions and an open base section between the walls. A shoulder is in the lower housing member located above the open base section. There is a top lid which has side walls and end walls adapted to be received over lower housing member. The top lid is proportioned to provide an access space along the side walls and end walls. The access space along side walls is less than the access space along said end walls. An activated trap plate is received on the shoulder, the activated trap plate including a plurality of curved sections adjacent to each of said walls and end walls and a curved section located between the side sections. The curved sections include curved surfaces extending towards the open base. The base includes a sticky pad to retain any insects which travel or fall into said open base. An attractant is positioned so that insects must traverse at the curved surface to reach the attractant, the curved surfaces being coated with an electrostatically, charged powder whereby the electrostatically charged powder is transferred to any insects which traverse the trap plate thereby causing the insect to lose stability fall into the open base where the insect is retained.

10 Claims, 6 Drawing Sheets

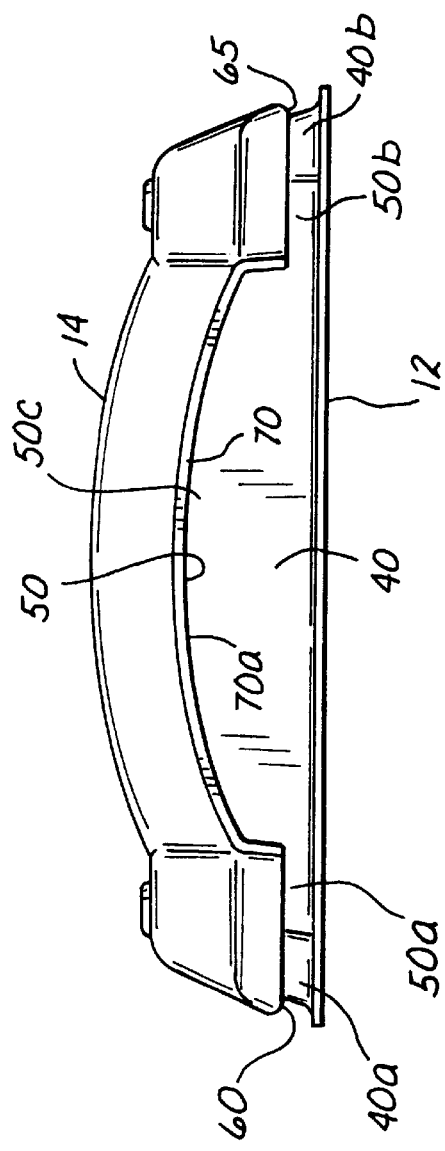
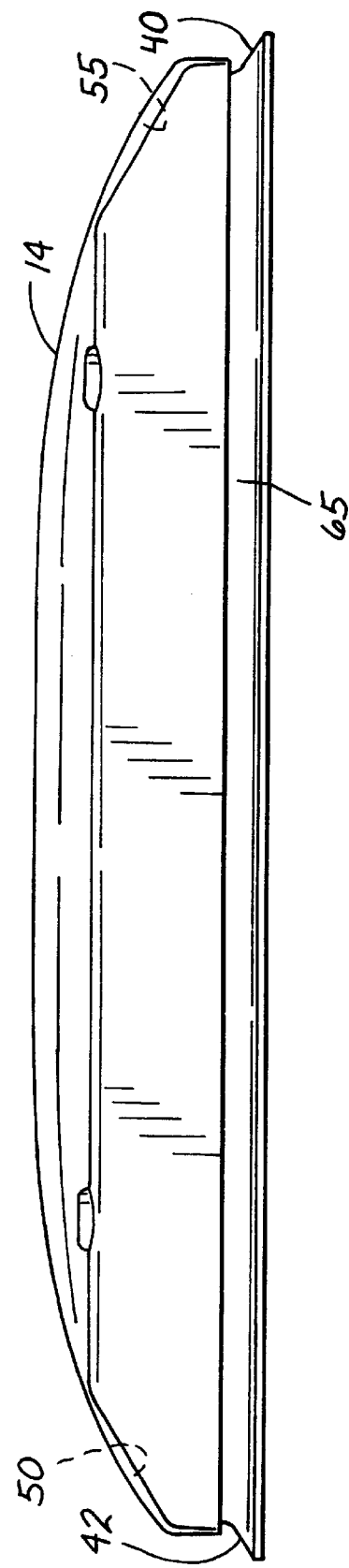

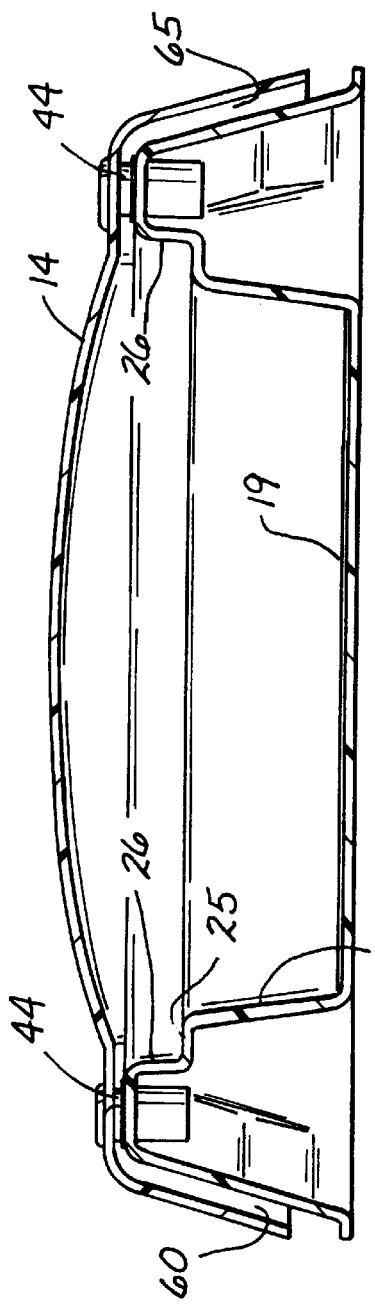
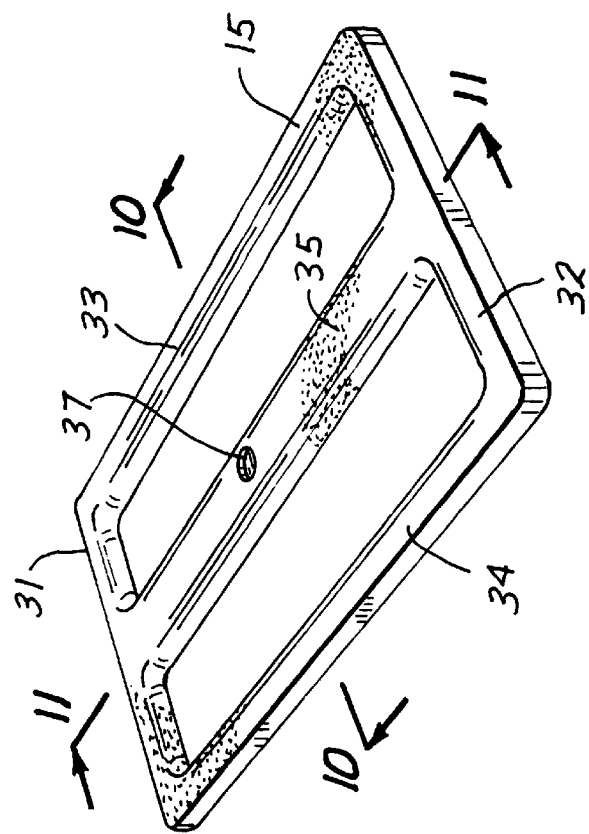

INSECT AND PEST TRAP

BACKGROUND OF THE INVENTION

1. Field of the Invention

This invention relates to traps for crawling insects and more particularly to an improved trap for use in pest control by which a crawling insect is trapped and/or killed and is especially useful for trapping and/or killing indigenous insects, pests, bugs and the like such as various species of cockroaches.

2.. Description of the Prior Art

It is well known that certain types of crawling vermin present a health problem. For example, cockroaches of which there are a wide variety, estimated to be about 3,500 species in the world and some 58 species in North America, tend to live in sewers or drains or in virtually any location in which food or food scraps are available for the pest to feed upon. It is known that roaches can cause health problems with saliva and excrement being left on food items and in food areas. They also leave spent exoskeleton (skin that is shed as they grow) and secretions which may trigger allergic reactions.

Roaches thrive in warm and moist climates. Typically, roaches are present in heated buildings in populated areas especially in large cities of North America and Europe. Large roach populations are known to be present in the kitchens of restaurants, even the most prestigious and those which take great care to control the crawling pests.

There are a number of species of roaches in North America, the largest being the American roach which may reach 1 to 1½ inches in length. The next largest is the oriental roach (waterbug) which may reach sizes of 1 to 1⅛ of an inch. The next size is the German roach which may reach lengths of ⅝ of an inch, followed by the brown-banded roach which can reach ½ inch size.

Most people have a squeamish reaction to crawling vermin such as roaches or other crawling insects such as water bugs or beetles. Such a reaction only heightens the anxiety and desire to eliminate such crawling insects, especially roaches, since there is a tendency to associate the presence of roaches with the presence of a local dirty environment and unsanitary conditions. It is not always the case that the presence of roaches, for example, signifies unsanitary conditions. Roaches are indigenous in some regions and are known to migrate from one location to another and to remain out of sight until it becomes dark. The result is that the presence of even a single roach causes the conscientious to take all reasonable steps to eliminate roaches.

A variety of different approaches have been used in the past to eliminate or control roach infestations. Some involve spraying with chemical pesticides which tend to be more damaging to the environment than the benefit which they provide in the elimination of roaches. Others are totally inadequate to solve the problem. It is also the case that the different species have somewhat different behavior.

For example, German roaches tend to aggregate in dark places, such as in an around refrigerators, dishwashers, stoves, washers, driers and water heaters. This species of roach is also known to aggregate in cracks and crevices simply because their feces contain a pheromone. The brown-banded roach is more likely to be found in hotels, furniture, closets and the like and avoid light. They feed on starch materials and non-food materials such as nylon etc. They tend to live in electrical appliances such as TV sets, stereo sets, radios and toasters.

Various approaches have been taken to control or eliminate roaches. One approach is the use of baited traps, the use of sprays and powders and various chemicals and pesticides. Other controls are also known, for example, U.S. Pat. No. 4,423,564 of Jan. 3, 1984 describes a method and apparatus for trapping and killing pests in which an attractant is used to lure the pests to a surface which is periodically pulsed electrically to dislodge the pest onto a sticky insert.

It is also known from the literature that insects carry an electrostatic charge. It is this electrostatic gradient across the outside of the cuticle of pest, usually a positive charge, which allows it to walk up vertical smooth walls or inclines surfaces, see for example, Beament, J. W. L. in *Nature Lond.* Vol. 191, 1061, pp 217–221. If the electrostatic charge is neutralized, the pest becomes destabilized and can no longer traverse smooth curved or inclined surfaces. Thus, in International Application Number PCT/GB93/01442, published on Jan. 20, 1994, there is disclosed the use of a positively charged powder which becomes attached to the feet and cuticle of a crawling insect to neutralize the electrostatic charge resulting in destabilizing the insect which then falls into a capture area. The design of the trap there described is diagrammatic at best and lacks some of the features needed for the trap to be totally effective in a commercial application.

Thus, one object of this invention is to provide an improved and effective trap for crawling insects which can both attract the insects and pests and trap and/or kill them.

Another object of this invention is to provide an improved trap for use with cockroaches which will attract and trap and/or kill the roaches without presenting an environmental problem.

A further object of this invention is to provide an improved trap which can tap and/or kill roaches of various sizes, especially as may be encountered in commercial installations such as restaurants and the like.

Yet another object of this invention is to provide an effective crawling insect trap which may be easily maintained, which is environmentally benign and which is effective as a device to control or markedly reduce crawling pests, such as roaches, in a particular area.

SUMMARY OF THE INVENTION

The above and other objects are achieved in accordance with the present invention by an improved insect trap for roaches and the like in which a trap plate is used, in cooperation with a trap housing and insect basin located in the base of the trap to retain insects in the trap once they have been lured into the trap by an attractant.

In a preferred form, the trap is composed of basically three parts, a lower housing which is of relatively low profile, a removable top lid and a trap plate supported within the lower housing. For reasons which will become apparent, the parts of the trap are made of nonconductive material so that the trap plate can retain an electrostatic charge. The top plate is charged electrostatically, as will be described, so as to retain electrostatically a powder which is attracted from the trap plate to the insect or vermin so as to neutralize the electrostatic charge on the feet or cuticle of the insect. With this charge on the insect's feet-cuticle effectively neutralized, the insect is incapable of traversing curved surfaces or inclined surfaces and effectively becomes destabilized.

The top lid protects the electrostatic charge on the trap plate from "leaking off" as the result of excess moisture thus enabling the trap plate to hold its charge and retain the powder in place, save for the transfer to the crawling insects, for some period of time.

The trap plate is preferably supported over an insect basin which is provided in the lower housing directly beneath the trap plate. The base of the insect basin includes a tacky sheet which retains the fallen insect. Optionally, the tacky sheet may contain an insecticide to dispatch the insects quickly. Since the insecticide is confined in the insect basin, it tends not to migrate and normally does not present environmental contamination problems.

The trap plate itself is of relatively thin plastic so as to hold an electrostatic charge well and which is easily electrostatically charged before insertion into the lower housing above the insect basin. In a preferred form, the trap plate is so configured that multiple surfaces are curved such that a destabilized insect falls into the insect basin located directly beneath the trap plate. To this end, the trap plate is supported by the lower housing and vertically above the insect basin. The multiple curved surfaces extend both along the long axis and the transverse axis, the trap itself being generally rectangular in shape, although other shapes may be used.

The trap is provided with end walls and side walls, the end walls of the lower housing and the top lid being inclined and each end being angled in opposite directions so as to form a ramp. The clearance between the lower housing an the opposed portion of the top lid in the region of the end walls is sufficiently large for passage of the larger species of roaches such as the American and oriental roach. By contrast the clearance between the top lid and the lower housing along the side walls of the trap is much less and in the nature of a crack or crevice clearance so as to attract the smaller species such as the German and brown-banded roach.

Upon entering the trap, either through an end clearance or a side clearance, the insect is drawn to the attractant, preferably supported on the trap plate. For the insect to reach the attractant, it must traverse the trap plate and the curved surfaces thereof. In doing so, the electrostatically charged powder is transferred to the insect's feet, thus destabilizing the insect with the result that it falls by gravity into or travels into the insect basin. Once in the insect basin, the insect cannot escape due to the sticky mat on the base of the insect basin.

Since the trap plate contains an electrostatically adhered powder and the trap plate in the insect basin contains some device to retain the insects, it is desired to be able to replenish the trap on a periodic basis. Thus, servicing is relatively simple since the top lid is held in place by magnetic plugs. Once the top lid is removed, the old trap plate may be removed, the sticky pad at the base of the insect basin is removed and both are replaced with a new pad and trap plate, as will be described. The old trap plate and pad are disposed of in an appropriate and safe manner. The ease and simplicity with which the pad and trap plate can be renewed and replaced have definite advantages, especially since the principal intended use of the trap of this invention is in commercial establishments and the traps are intended to be serviced by professional service personnel.

The foregoing and other objects, features and advantages of the invention will be apparent from the following and more detailed description of a preferred form of the present invention and accompanying drawings, it being understood that such is by way of explanation and not to be deemed a limitation on the present invention.

BRIEF DESCRIPTION OF THE DRAWINGS

FIG. 3 is a side view taken along the line 3—3 of FIG. 1;

FIG. 4 is another side view as taken along the line 4—4 of FIG. 1;

FIG. 5 is a view partly in section and partly in elevation taken along the line 5—5 of FIG. 1;

FIG. 9 is a view in perspective of the trap plate in accordance with this invention;

FIG. 10 is a view, partly in section and partly in elevation, taken along the line 10—10 of FIG. 9; and FIG. 11 is a view, partly in section and partly in elevation, taken along the line 11—11 of FIG. 9.

DESCRIPTION OF THE PREFERRED EMBODIMENT

Figure 1:
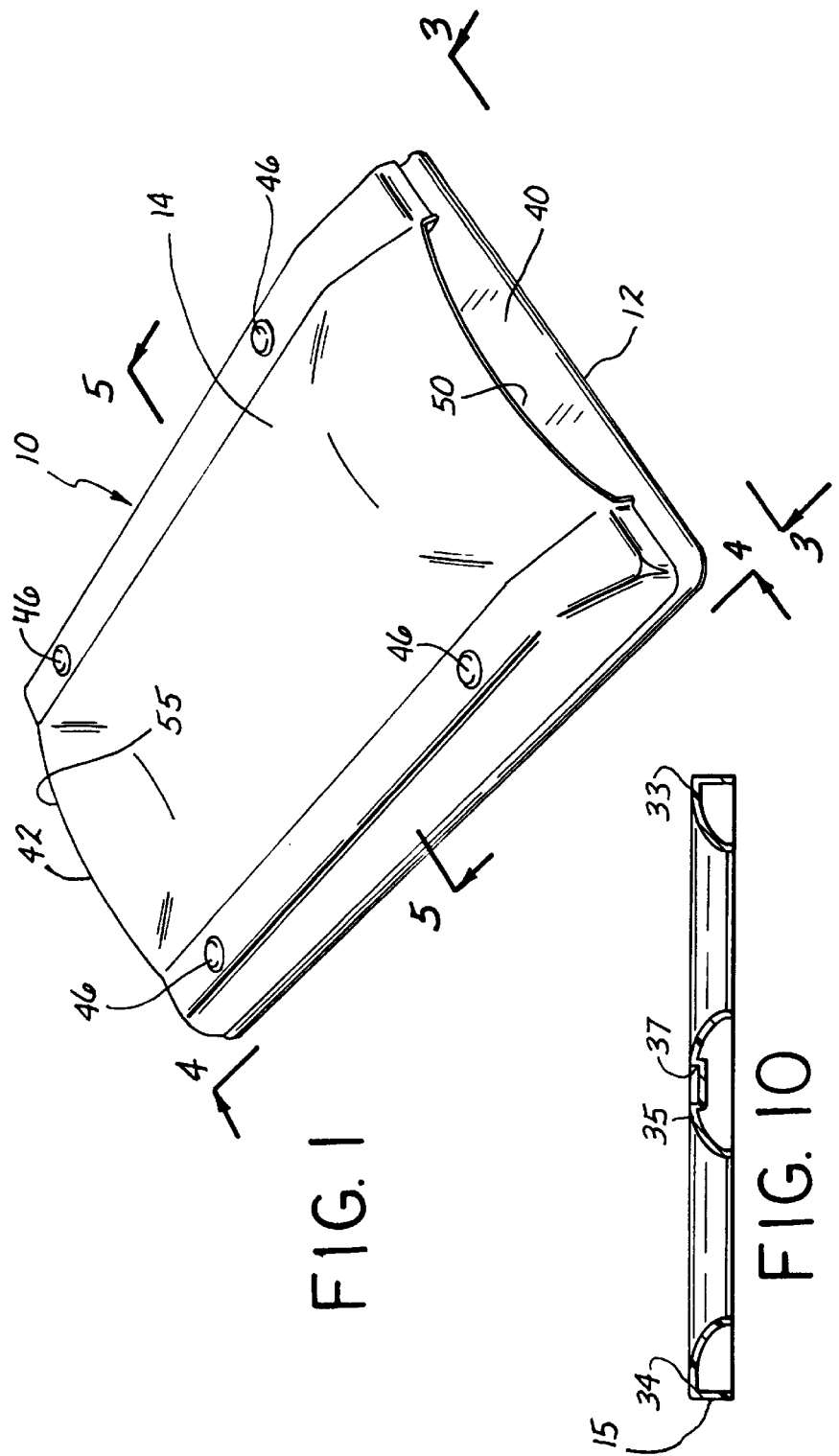
FIG. 1 is a view in perspective of insect and pest trap in accordance with the present invention.
Figure 2:
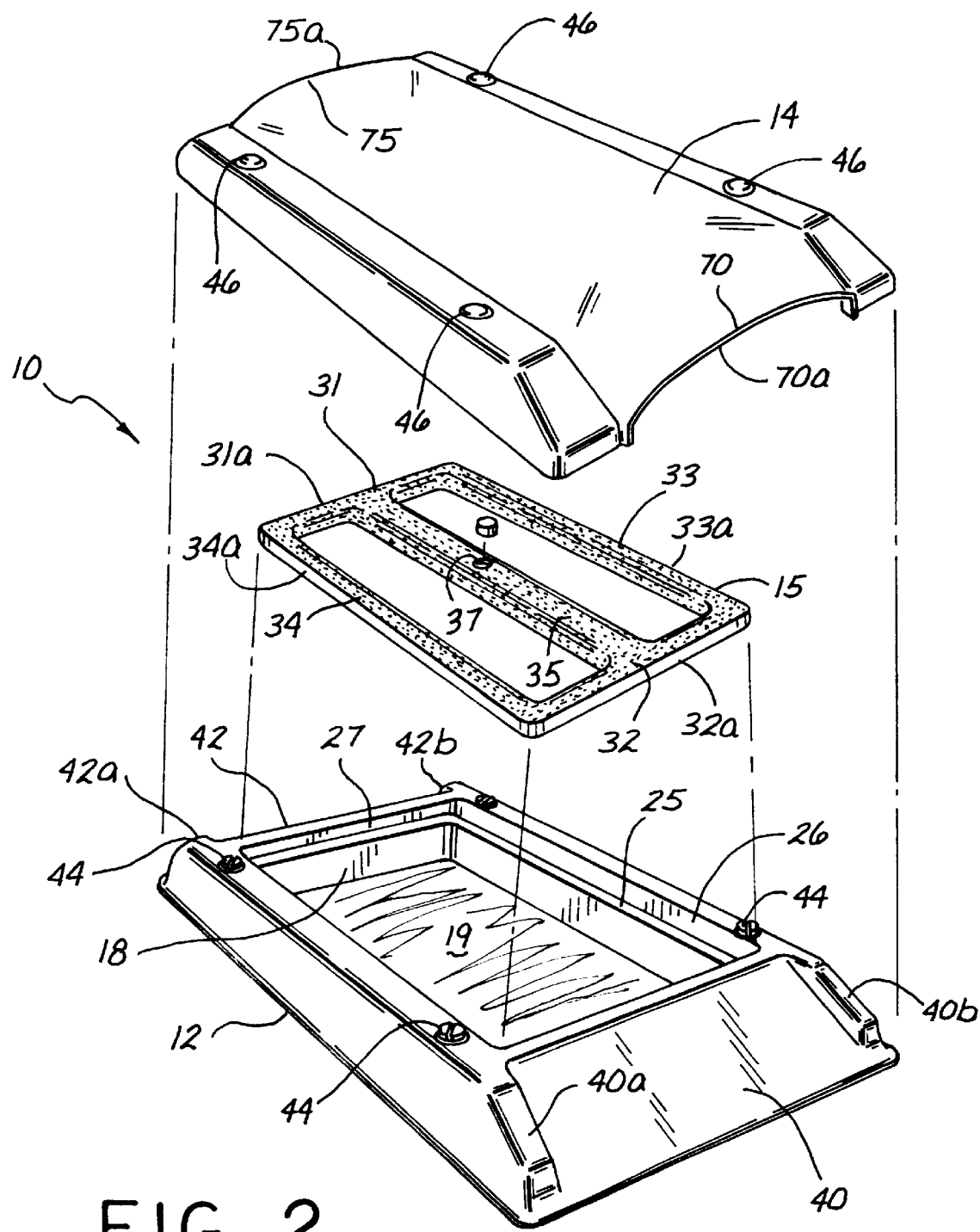
FIG. 2 is a developed view of the insect and pest trap illustrated in FIG. 1.

Referring to the drawings, FIGS. 1 and 2 are a diagrammatic illustration of the improved insect trap 10 of the present invention. The trap 10 is especially adapted for use with cockroaches, although not limited to such pests. For purposes of description, however, references will be made to roaches.

The trap 10 includes a lower housing 12, a top lid 14 and a trap plate 15, the latter positioned between the top lid and the lower housing as illustrated and as will be described. As shown, the lower housing includes an insect basin 18 which is recessed in the base of the lower housing. In the base of the insect basin, there may be located a sticky pad 19, the latter may also include an insecticide. The purpose of the pad is to retain any insects which come into contact with the same. Various sticky materials are known in the art. The insect basin is surrounded by a shoulder 25 which includes portions 26 along the long axis and portions 27 along the short axis, see for example, FIG. 6. The long axis is the side wall portion of the lower housing while the short axis is in the end portion as will be described, the trap being generally rectangular in shape and of a depth of three to four inches. This shape is effective for use in restaurants where the traps are usually placed under large refrigerators and stoves, both usually supported off the floor with space underneath them, as well as under sinks since roaches are attracted by moisture.

Figure 7:
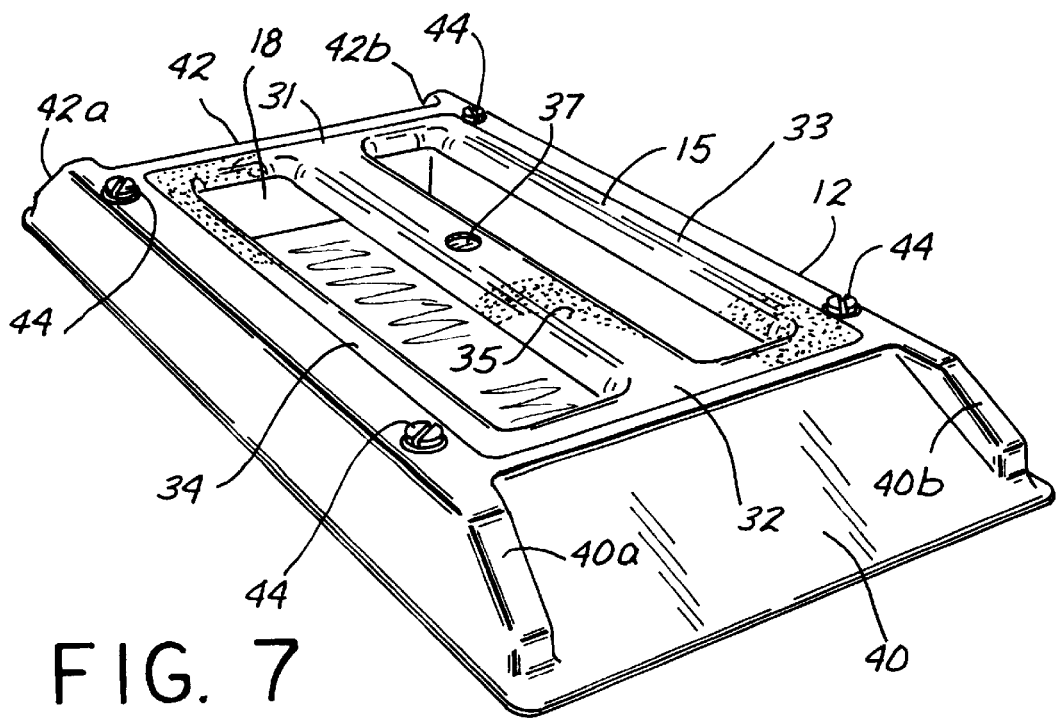
FIG. 7 is a perspective view of the lower housing of the pest and insect trap of FIG. 1 with the top lid removed and the trap plate properly positioned.

Received on the shoulder 25 and supported vertically above the insect basin 18 is the trap plate 15, see for example FIG. 7, the latter separate from the lower housing 12 and the top lid 14. As is seen in the drawings, especially FIG. 7, the trap plate fits closely in the shoulder section just above the insect basin. It can also be seen that the trap plate includes end sections 31 and 32, longer side sections 33 and 34 and a center section 35. Located in the center of the center section 35 is an attractant well 37, the purpose and function of which will be described.

Figure 8:
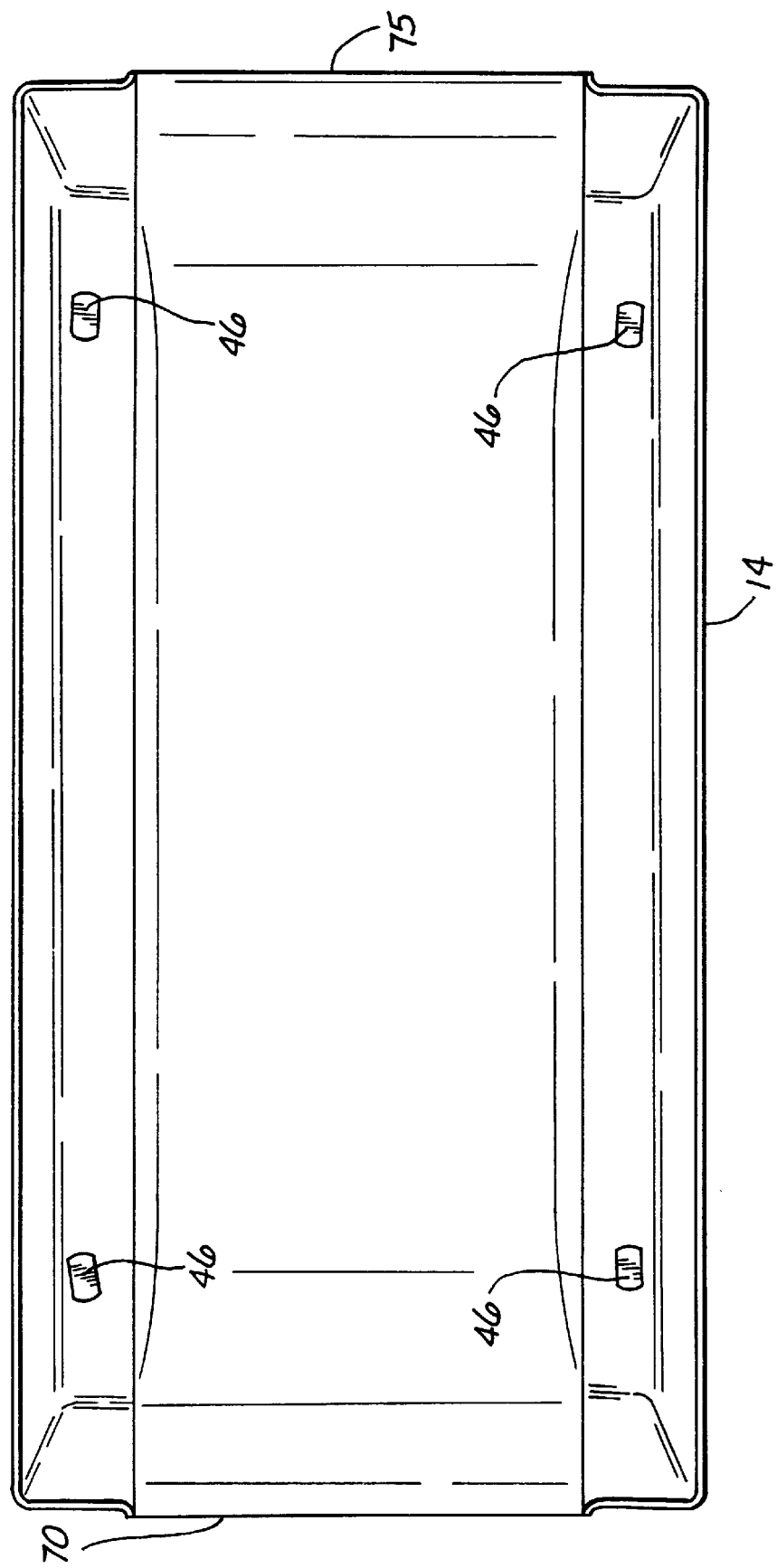
FIG. 8 is a view in perspective of the underside of the top lid of the insect and pest trap of FIG. 1.

Referring now to FIGS. 3 to 5 inclusive, the lower housing includes outer end sections 40 and 42, each inclined as shown (see also FIGS. 6 and 7), and diverging away from each other. On each of the inclined end sections there are a pair of laterally spaced pads 40a and 40b, on one end, and 42a and 42b on the other end. These pads cooperate with the top lid 14, see FIG. 8, to maintain the top lid spaced from the lower housing such that there is a clearance between the under side of the top lid and the upper side of the lower housing. To maintain the top lid in place on the lower housing are a set of magnets 44 on the lower housing and a set of metal plugs 46 on the underside of the top lid, see FIG. 8. The magnets and plugs are received in pockets in the respective lid and housing in which they are received. Arranged in this way, the top lid cannot move laterally or horizontally with respect to the lower housing and the magnets tend to releasably secure the two parts against relative vertical movement.

With the top lid and lower housing disposed in the manner thus far described, there are a plurality of clearance spaces 50 and 55 at the ends and 60 and 65 along the sides. The clearance spaces extend completely around the trap and those along the sides are basically the same in open dimensions while the clearance spaced at the ends are also the same in open dimensions but different in size from the side wall clearance spaces. As seen in FIG. 3, the clearance space 50 is narrower along the edges 50a and 50b than along the center section 50c. This difference in clearance space at the ends is due to the fact that the top lid in the end sections 70 and 75 thereof includes an arcuate center section 70a and 75a. The ends are basically the same and appear as shown in FIG. 3. The reason for the larger clearance at the ends is to permit entrance by the larger species of roach such as the American and oriental roaches.

By contrast, the side clearances 60 and 65 are basically uniform along the length since the side walls of the top lid are disposed in planar parallel relation with the opposed side walls of the lower housing, as seen in FIGS. 4 and 5. In effect these side clearances are of much smaller dimensions and are proportioned to appear as crevices to attract the smaller roach species such as the German and brown-banded roaches.

Figure 6:
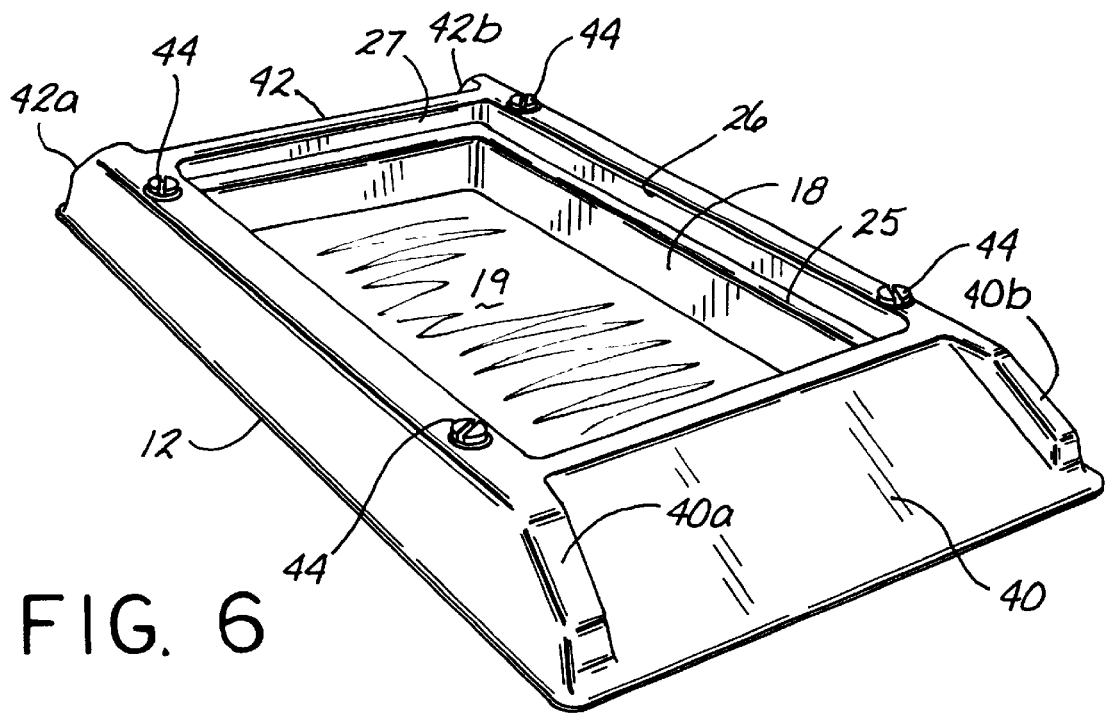
FIG. 6 is a perspective view of the lower housing of the insect and pest trap of FIG. 1 with the top lid removed and the trap plate removed.

As seen from FIGS. 5–7, as a roach enters any clearance, attracted there by an attractant, it is necessary for the roach to traverse at least a portion of the trap plate 15 in order for the roach to reach the attractant well 37. The well may contain any one or a combination of attractants such as baits, of which there are a large number known, or pheromone of which there are several known, or a combination of both. The exposed surfaces of the trap plate are coated with a powder, electrostatically bound to the surface of the plate, even the curved surfaces thereof. Typically, insulating plastics tend to develop an electrostatic charge when rubbed by cloth and the like. The electrostatic charged surface will attract and hold an electrostatically chargeable powder. Examples of the powders which can be used are fine particles of talc (magnesium silicate) or fine particles of carnauba wax since these carry an electrostatic charge opposite to that of the roach or other insect.

As a roach enters the trap, attracted by the odor of the bait or pheromone or both, it traverses a coated surface which it must traverse to reach the bait well 37. The powder is then transferred to the roach and neutralizes the charge on the roach's cuticle-feet and the roach is destabilized and falls into the insect basin where it is trapped by the sticky material. Even if not caught by the sticky material, the roach will have difficulty since it must traverse an essentially vertical smooth wall which forms the inside surface of the well, see for example FIG. 5.

Referring now to FIGS. 9–11, one can obtain a better understanding of the reason for the effectiveness of the insect trap 10 of this invention. The trap plate 15 is uniquely configured in that all surfaces save the peripheral surfaces 31a, 32a, 33a and 34a which are in contact with the adjacent shoulder wall of the lower housing are curved. Accordingly, regardless of which direction a roach enters the trap, it must traverse a surface of the trap plate and thus accumulates sufficient charged powder on the surface of the trap plate to neutralize the electrostatic charge on the insect's feet-cuticle. As the insect attempts to reach the attractant in well 37, it must traverse some surface of the trap plate. While the shortest distance to the attractant well is from the center of either end wall adjacent sections 31 or 32, a portion of section of each of those sections as well as a portion of the center section 35 must be traversed. That travel is sufficient to cause transfer of the powder to the insect's feet-cuticle and to destabilize the roach. Unable to gain a secure footing on the curved or inclined surfaces of any of the sections 31, 32, 33, 34 or 35, the roach then falls into the insect basin and is trapped there as already described.

As will be apparent, periodic care should be taken of the trap 10. Basically this involves removal of the sticky pad 19 and replacement of the same and replacement of the trap plate 15 with a new plate properly activated. One convenient manner by which to achieve this is to package a new pad 19, attractant capsule for placement in the well and a new trap plate and activating powder in a package which contains all of the replaceable items and provides a way to safely dispose of the spent items. The new pad may include a removable and releasable protective cover to protect the sticky surface of the pad.

Thus, the sealed package is opened and the items are removed. The new trap plate is electrostatically charged by rubbing all surfaces with a dry cloth. The plate is placed in the package along with the activated powder and the package is shaken to cause the powder to deposit on all charged portions of the plate. The newly charged plate is removed from the package and placed aside care being taken not to discharge the plate. The old plate is removed from the trap and placed in the package. The old pad, with roaches stuck thereto is removed, folded in half and placed in the package and the latter is sealed by tape or the like. The protective cover of the new pad is removed and it is placed in the insect basin at the base thereof. The newly activated trap plate is placed on the shoulder, a new attractant capsule placed in the well and the top lid replaced. The trap is then placed in the desired location. The spent items are sealed in a container and may be disposed of in a safe and environmentally correct manner.

It is contemplated that numerous changes, modifications and/or additions may be made to the specific embodiment of the invention shown in the drawings and described above without departing from the spirit and scope of the present invention. Accordingly, it is intended that the scope of the present invention be limited only by the scope of the appended claims.

What is claimed is:

1. An improved insect and pest trap for roaches of various sizes and the like comprising:

an elongated lower housing member having side walls and end walls which are inclined in opposite directions and an open base section between the walls, shoulder means provided in said lower housing member located above said open base section, top lid means having side walls and end walls adapted to be received over said lower housing member, said top lid being proportioned with respect to said side and end walls of the lower housing to provide an access space along the side walls and said end walls and which opens into said open base section, the access space along said side walls having a clearance less than the access space along said end walls, an activated trap plate being received on said shoulder and being spaced from the top lid and the open base section, said activated trap plate including a plurality of spaced curved sections adjacent to each of said side walls and end walls and an additional curved section located between the curved sections and spaced therefrom, the curved sections and the additional section including curved surfaces extending towards the open base, means in said base to retain any insects which travel or fall into said open base, attractant means in said insect trap positioned so that insects must traverse at least a portion of the curved surfaces to reach the attractant, the curved surfaces being coated with an electrostatically charged powder whereby the electrostatically charged powder is transferred to any insects which traverse the trap plate thereby causing the insect to lose stability on the curved surface and fall into the open base where the insect is retained.

2. An improved insect and pest trap as set forth in claim 1 wherein said lower housing member, said top lid means and said activated trap plate are each made of material capable of retaining an electrostatic charge.

3. An improved insect and pest trap as set forth in claim 1 wherein the access space is continuous and extends along said end walls is of a non-uniform clearance and includes a center region having an opening greater than the regions adjacent the center region.

4. An improved insect and pest trap as set forth in claim 1 wherein said lower housing member and said top lid includes means to maintain the top lid in spaced relation to said lower housing member so as to form continuous access spaces extending continuously along each side of the trap.

5. An improved insect and pest trap as set forth in claim 4 further including means to releasably secure the top lid to the lower housing member.

6. An improved insect and pest trap as set forth in claim 3 wherein the access space along said end walls is sufficient to permit passage of American and oriental roaches.

7. An improved insect and pest trap as set forth in claim 4 wherein said lower housing member includes spaced support pads on the end faces for supporting the top lid in spaced relation to the lower housing member.

8. An improved insect and pest trap as set forth in claim 1 wherein said trap plate includes end portions and side portions with a center portion located between the side portions and spaced therefrom, said activated trap plate including open sections between the spaced curved sections and said additional section thereby forming a plurality of open areas above the said open base.

9. An improved insect and pest trap as set forth in claim 8 wherein said trap plate is activated by a finely divided powder electrostatically retained on said trap plate and which can be transferred to an insect traveling over said trap plate to destabilize the same.

10. An improved insect and pest trap as set forth in claim 9 wherein said finely divided powder is selected from the group consisting of carnauba wax and talc.

* * * * *